Figure 1:
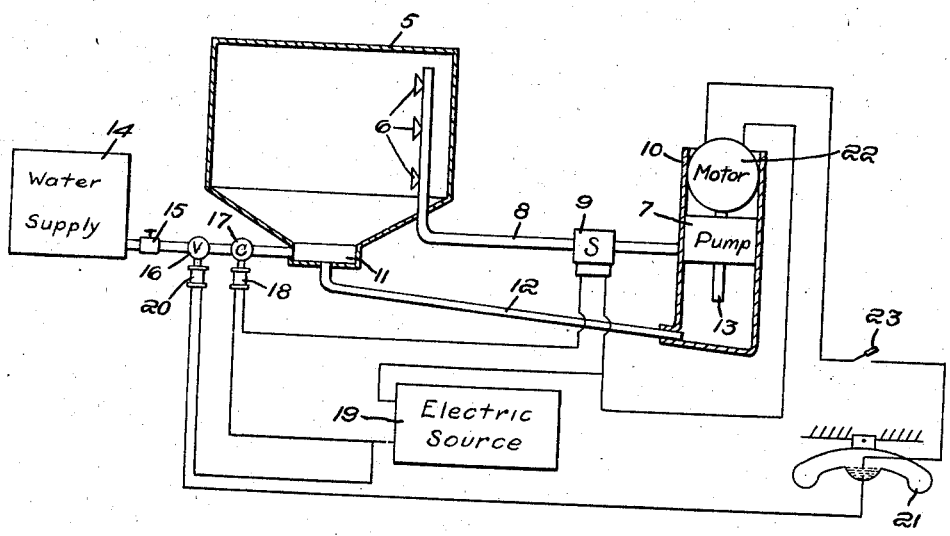

Sept. 15, 1942.                H. HEMMING ET AL                2,296,034
                                AIR WASHER SYSTEM
                                Filed July 15, 1940

INVENTORS
HAROLD HEMMING and
BY CHARLES W. PETERSON

Robert T. Palmer
ATTORNEY

Patented Sept. 15, 1942

2,296,034

UNITED STATES PATENT OFFICE 2,296,034

AIR WASHER SYSTEM

Harold Hemming, Dedham, and Charles W. Peterson, West Roxbury, Mass., assignors to B. F. Sturtevant Company, Hyde Park, Boston, Mass.

Application July 15, 1940, Serial No. 345,484

2 Claims. (Cl. 261—72)

This invention relates to air washer systems and relates more particularly to air washer systems for the conditioning of the air in passenger vehicles.

In a railway passenger car on account of space limitations, it is usually necessary to locate the air conditioning equipment in one end of the car in the roof zone. Problems in the use of air washers in railway cars reside in the location of the water supply and its control. The railroad managements do not desire storage tanks on the undersides of the cars. There is not space overhead for the usual relatively deep make-up water tank with float valve control. It is necessary to prevent the air washer sump from leaking due to movement of the cars and from other causes. These problems have heretofore prevented extensive use of air washers in railway passenger cars.

An object of this invention is to reduce the quantity of water required for air washers.

Another object of the invention is to dispense with float valves for controlling water levels in make-up water tanks for air washers.

Another object of the invention is to prevent leakage from air washers.

Other objects of the invention will be apparent from the following description taken with the drawing.

Figure 2:
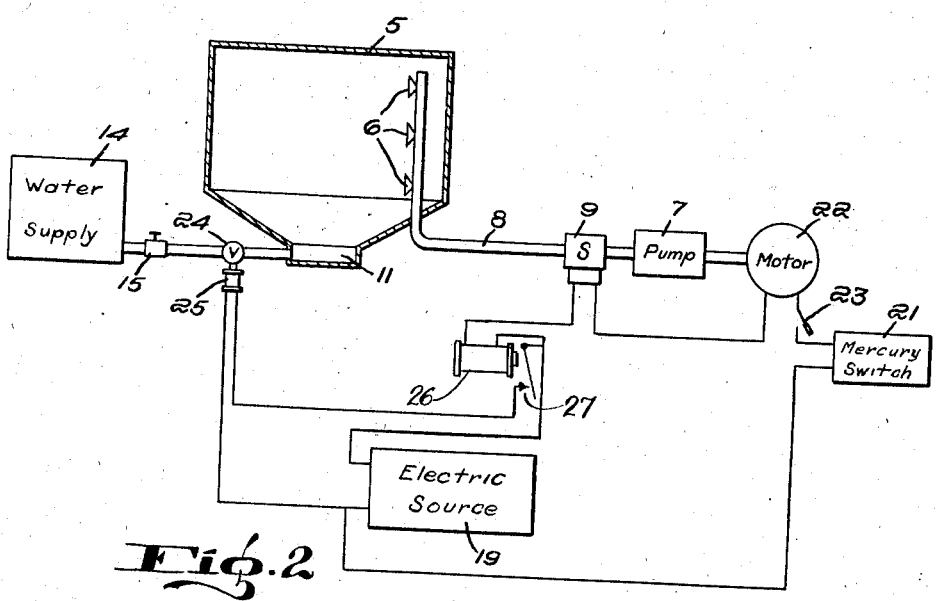

The invention will now be described with reference to the drawing, of which:

Fig. 1 is a diagrammatic view of an air washer system with controls, embodying this invention, and Fig. 2 is a diagrammatic view of another air washer system embodying this invention.

Referring now to Fig. 1, the air washer 5 contains the spray nozzles 6 which are supplied with water by the pump 7 through the pipe 8 containing the pressurestat 9.

The pump 7 is mounted within the cylindrical water-tight casing 10 which is connected to the sump 11 of the washer by the pipe 12 which is inclined for natural drainage as illustrated. The pump suction pipe 13 extends downwardly into the lower portion of the casing 10.

Usually the pump suction pipes are connected directly to the washer sumps and the pumps are unconfined. In such prior arrangements leakage from the pumps and pump connections caused water to fall into the passenger space. With the above described arrangement any water leaking from the pump will fall into the lower portion of the casing 10 into the water drained from the washer sump.

The water tank 14 supplies make-up water through the hand operated valve 15 and the solenoid valves 16 and 17 into the sump 11 of the washer 5. The solenoid 18 of the valve 17 is connected in series with the pressurestat 9 and the electric source 19. When the pump 7 is supplying water to the nozzles 6, it develops a pressure of about five pounds per square inch which pressure acts through the pressurestat 9 to open the electric circuit of the solenoid 18 causing it to maintain the valve 17 closed. The valve 16 is normally open as will be explained later. If the quantity of water in the washer system diminishes due to evaporation or for other reasons, the pump will be unable to develop the five pound pressure; the pressurestat will act to close the electric circuit of the solenoid 18 causing it to become energized and to open the valve 17 to add make-up water from the tank 14 to the washer 5.

When the system is not operating, no pressure will be developed by the pump and to prevent make-up water from being supplied at such times to the washer, the valve 16 with its solenoid 20 is provided. The solenoid 20 is connected in series with the mercury switch 21, the pump motor 22, the control switch 23, and the electric source 19 and when the switch 23 is open the solenoid 20 is deenergized causing the valve 16 to be closed.

The mercury switch is mounted transverse the car and is so arranged that if the car tips to one side or the other 3° or more the circuit of the pump motor 22 is opened causing cessation of the water supply. This enables the usual overflow pipe (not shown) to be placed at any convenient place in the washer. With this arrangement water is not lost through the overflow as when the train is standing or moving on tracks which are not level, with the water level higher in the overflow side of the washer sump as often happens.

The embodiment of the invention illustrated by Fig. 2 is similar to that of Fig. 1 except that only one solenoid valve is between the tank 14 and the washer 5, and a relay 26 is provided for preventing this valve from opening when the system is shut down. The solenoid 25 adjusts the water control valve 24 between the tank 14 and the washer 5 and is connected in series with the contacts 27 of the relay 26, and the electric source 19. The winding of the relay 26 is connected in series with the pressurestat 9, the motor 22, the switch 23, the mercury switch 21 and the source 19. When the switch 23 is opened, the energizing circuit of the relay 26 will be open and the contacts 27 will be separated thus opening the energizing circuit of the solenoid 25. This causes the solenoid 25 to release and the valve 24 to be closed. The valve 24 normally closed will open only when the pressurestat 9 calls for water and the pump is operating.

The above described apparatus and arrangements of apparatus enable the desired water levels to be maintained without the necessity for the usual float valves. Float valves not only require deeper and larger tanks but the motion of the trains causes the floats to bounce around and at times to admit water when it is not required.

Features of this invention have been found advantageous not only in the usual type air washers but in evaporative condensers and in air coolers where water is sprayed upon refrigerant evaporators. The term "air washer" as used herein includes such equipment.

While embodiments of the invention have been described for the purpose of illustration, it should be understood that the invention is not limited to the exact apparatus and arrangements of apparatus described, as modifications thereof may be suggested by those skilled in the art without departure from the essence of the invention.

What is claimed is:

1. An air washer system comprising an air washer having spray nozzles and a sump, means including piping and a pump for recirculating water from said sump through said nozzles, a make-up water tank, means including a valve connecting said tank and said sump, and means including pressure responsive means in said piping between said pump and said nozzles for opening said valve for admitting water from said tank to said sump when the water pressure in said piping falls below a predetermined point.

2. An air washer system comprising an air washer having spray nozzles and a sump, means including piping and a pump for recirculating water from said sump through said nozzles, a make-up water tank, means including a valve connecting said tank and said sump, means including pressure responsive means in said piping between said pump and said nozzles for opening said valve for admitting water from said tank to said sump when the water pressure in said piping falls below a predetermined point, and means for rendering said last mentioned means ineffective to open said valve when said pump is idle.

HAROLD HEMMING.
CHARLES W. PETERSON.